United States Patent [19]

Thomamueller et al.

[11] 4,335,587
[45] Jun. 22, 1982

[54] UNIVERSAL COUPLING MEMBER FOR TWO SHAFTS AND METHOD OF MANUFACTURING SUCH A COUPLING MEMBER

[75] Inventors: Dieter Thomamueller, Bruckmuehl; Klaus Brunsch, Wolfratshausen, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 164,186

[22] Filed: Jun. 30, 1980

[30] Foreign Application Priority Data

Jul. 11, 1979 [DE] Fed. Rep. of Germany ....... 2927955

[51] Int. Cl.³ .................... F16D 3/78; B65H 81/00
[52] U.S. Cl. .................................... 64/11 B; 156/155; 156/161; 156/165; 156/175; 403/223
[58] Field of Search ............... 156/172, 173, 175, 194, 156/165, 161, 155; 64/1 R, 1 S, 2 R, 11 R, 11 B, 27 NM; 74/581 R; 458/388, 376, 377, 36; 285/226, 229, 423; 403/223, 300

[56] References Cited

U.S. PATENT DOCUMENTS

4,116,018 9/1978 Weible .............................. 64/11 B
4,173,128 11/1979 Corvelli ............................. 64/11 B

FOREIGN PATENT DOCUMENTS

2237775 2/1974 Fed. Rep. of Germany .
2422181 11/1975 Fed. Rep. of Germany .
2435450 2/1976 Fed. Rep. of Germany .

Primary Examiner—Michael W. Ball
Attorney, Agent, or Firm—W. G. Fasse; D. F. Gould

[57] ABSTRACT

A drive shaft including a universal coupling is made in the form of a unitary bonded fiber material structure having anisotropic properties. A winding form or mold is assembled to include, for example, an elongated winding sleeve, a flange forming core element, and an elongated winding mandrel joined together. Impregnated fiber material is wound onto the mold so that the fibers of the winding lie at thread angles approximately ±45° with respect to the longitudinal axis of the form or mold. The wound structure is compressed whereby the coupling assumes its intended shape after curing or hardening. Portions of the form or mold are removed, for example, by dissolving and washing in a suitable solvent. Alternatively the drive shaft coupling is formed directly on the torque transmitting shafts to be coupled so that the transmitting shafts are integrated into the unitary structure. The annular flange and 45° winding result in a structure which affords a high torsional rigidity while allowing deformation of the structure in the three directions of space.

5 Claims, 5 Drawing Figures

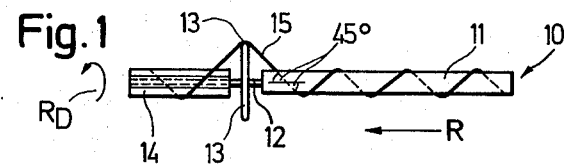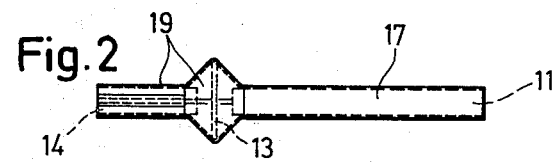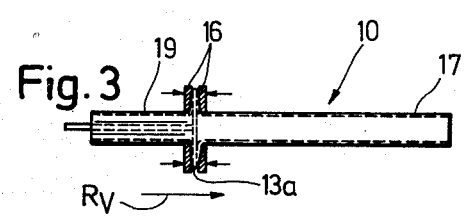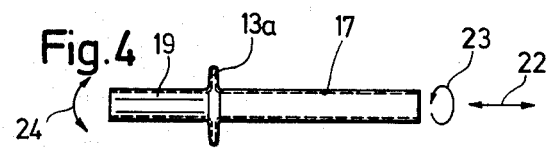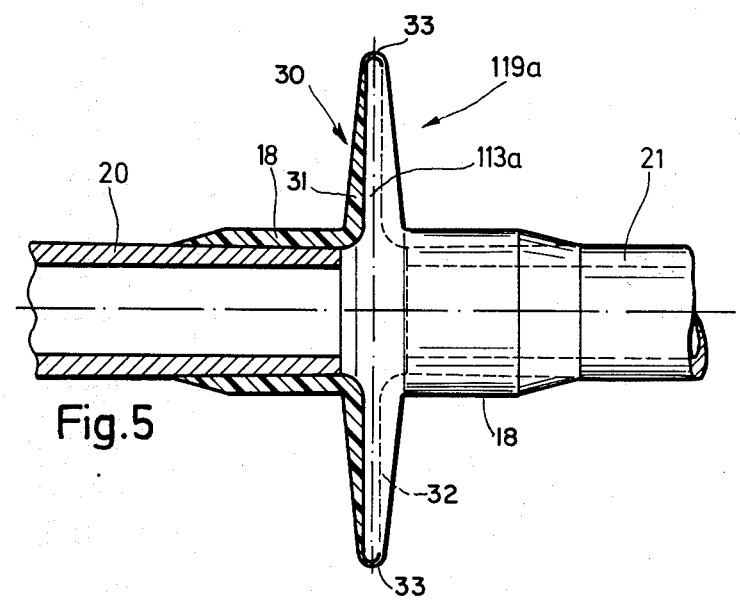

UNIVERSAL COUPLING MEMBER FOR TWO SHAFTS AND METHOD OF MANUFACTURING SUCH A COUPLING MEMBER

BACKGROUND OF THE INVENTION

The invention relates to a method of manufacturing a universal coupling member for coupling a driving member to a driven member. The coupling member is made of fiber compound material, the fibers of which are wound with a thread angle of about ±45° with reference to the central axis of the shaft. The invention also relates to a driving shaft manufactured according to this method.

It is necessary, in instances of transmitting driving torques over larger distances by means of an arrangement of shafts, to integrate components in this shaft system, which components permit a compensating for angular changes and length changes. This is currently done generally by the use of so-called Bendix disc clutches, Hardy couplings or clutches and the like. A large number of suggestions have been made for this purpose. However, all prior solutions have the disadvantage, that, first they require many individual components and second, they are not maintenance free. The connecting members have to be routinely checked. Special constructions and shapes of the coupling member are required, depending on the occurring of the effective forces, to provide a torsionally rigid connection of two shafts which are not exactly axially aligned. Examples of such constructions are shown by the German Patent Publication DE-OS No. 2,422,181 illustrating a bellows-type coupling, or by the German Patent Publication DE-OS No. 2,435,450 illustrating radially slotted round bodies as coupling members. Apart from the number of structural parts required, most of the embodiments included in the prior art also have considerable weight.

The German Patent Publication DE-OS No. 2,237,775 suggested, in order to avoid this weight, to wind a power transmitting member with fiber reinforced material with a thread angle of ±45° with reference to the central axis of the structural component which is subjected to tension, pressure, and/or torsion loads. Such a structure is, however, only suitable for very special purposes.

OBJECTS OF THE INVENTION

In view of the foregoing it is the aim of the invention to achieve the following objects singly or in combination:

to provide a unitary compound fiber material drive shaft structure including a universal coupling member for transmitting torque;
to wind the fiber material at a thread angle of about ±45° with reference to the drive shaft axis whereby the shafts have anisotropic properties under stress;
to provide a unitary drive shaft structure and coupling member which affords high torsional rigidity while allowing deformation of the structure in the direction of the longitudinal axis and angular deviation from the longitudinal axis;
to provide a simple, reliable, and inexpensive method for manufacturing unitary universal joint coupling members of fiber compound material;
to provide a method for manufacturing of universally transmitting drive shafts, which reduces the number of components, reduces the weight of the structure, and increases the strength characteristics in spite of said weight reduction; and
to construct a drive shaft of fiber compound material whereby shaft elements are coupled by an integral, universal joint coupling member to permit deformations of the shaft in the axial and in angular directions relative to the shaft.

SUMMARY OF THE INVENTION

In order to accomplish these results the present invention contemplates the following method for manufacturing drive shaft coupling members for coupling and universal transmission of torque between a driving member and a driven member or component. Such drive shaft structures are formed of bonded fiber material with fibers wound at a thread angle of approximately ±45° with reference to the central axis of the drive shaft means. According to the present method, a winding form is assembled by joining in sequence an elongate winding sleeve generally corresponding in shape to a first transmitting drive member to be coupled by the drive shaft, a flange core of greater diameter than the rest of the drive shaft for defining a universal flange coupling in the middle of the drive shaft, and a winding arbor defining the other end of the drive shaft means. The winding form sleeve, flange core and arbor means are aligned along a common central axis and spaced at fixed intervals relative to each other. This assembly may be accomplished using a winding arbor in the form of a winding mandrel with a thin shaft over which the core and elongate sleeve are fitted. These elements may be glued together with a dissolvable glue. Over the winding form so assembled is wound impregnated fiber material so that the wound fiber lies at fiber or thread angles of approximately ±45° with reference to the central axis of the winding form thereby accumulating layers of windings in the form of a winding shell over the form. The glue fixing the winding sleeve relative to the core and winding arbor is dissolved and the winding sleeve and arbor are pressed together in the axial direction of the drive shaft thereby compressing the intermediate core and portion of the winding shell over the core. This step establishes the shape of the universally transmitting flange in the middle portion of the winding shell and subsequent drive shaft. Finally, the impregnated fiber winding shell is hardened to form the drive shaft means.

The invention also contemplates removing portions of the winding form such as the winding arbor or winding mandrel and shaft from the hardened shell to provide the hollow bonded fiber material drive shaft for coupling together different transmitting members and affording transmission of torque through the flange portion of the drive shaft. According to one aspect of the invention the flange core means of the winding form is made of dissolvable material and the method further includes the step of dissolving and washing away the core after winding, pressing and hardening the winding shell. Other elements of the winding form assembled in accordance with the invention such as the spacers may also be formed of dissolvable material and dissolved and washed away after winding, pressing and hardening the winding shell.

A feature and advantage of this arrangement is that a hollow drive shaft coupling is provided in a configuration with a central annular protuberance or flange which introduces into the drive shaft coupling anisotropic properties under stress affording high torsional rigidity while allowing deformation of the structure in the direction of the longitudinal axis and angular deviation from the longitudinal axis.

In addition to providing a hollow drive shaft coupling with a universal flange for universal transmission of torque between a driving member and a driven member the invention also contemplates providing a unitary drive shaft structure in which the winding sleeve itself comprises or is substituted with a first torque transmitting shaft member and in which the winding arbor means itself comprises or is substituted with a second torque transmitting shaft member. According to the invention the hardened winding shell integrates the first and second transmitting shaft and intermediate press core into a single universally torque transmitting structural drive shaft.

BRIEF FIGURE DESCRIPTION

In order that the invention may be clearly understood, it will now be described, by way of example, with reference to the accompanying drawings, wherein:

FIG. 1 shows a schematic representation of the first phase of the method according to the invention, that is, the beginning of the winding process;

FIG. 2 illustrates the second phase, that is, the condition after the end of the winding process;

FIG. 3 shows the third phase of the method including a displacing or pressing process prior to the hardening or curing;

FIG. 4 shows the fourth phase in which the finished component is removed or rather separated from its mold and illustrating the individual function or action possibilities; and FIG. 5 shows a partial section through a further example embodiment of a driving shaft according to the invention.

DETAILED DESCRIPTION OF PREFERRED EXAMPLE EMBODIMENTS AND OF THE BEST MODE OF THE INVENTION

FIGS. 1 to 4 illustrate schematically the present method for manufacturing a universal coupling member for transmitting torque over larger distances and including a universal joint between two shaft components. In general, the present method utilizes the low rigitidy in the flange region or coupling region resulting from the ±45° winding layers, which permit the transmitting of large torques while allowing deformations of the driving system in the direction of the longitudinal axis and also permitting angular changes of the rotating axis due to said low rigidity. In addition, the anisotropic properties of the material combination also play a part as does the resulting decrease in the wall thickness of the coupling member in the flange region. A high torsional rigidity is maintained as a result of the nearly constant ±45° layering of the fibers. This constant ±45° layering also applies to the coupling region. This angular layering simultaneously achieves a perfect centering of the two central axes of the shaft members. The proposed method of manufacturing the present drive shaft 10 is carried out by including the winding process.

FIG. 1 shows the first phase or step of the method. A shell or sleeve 14, for example, having a hexagonal shape, is pushed onto a thin shaft 12 of a winding mandrel 11. Prior to this, a coupling core 13, for example made of a dissolvable material such as an alloy with low melting point or a core made of sand and polivinyl-alcohol was pushed onto the thin shaft 12. The shell 14, the core 13, and the winding mandrel 11, the latter with its facing end butting against the thin shaft 12, are spaced from each other at definite intervals and form a winding mold. These intervals or spaces may be fixed, for example, by means of spacers not shown but also made of a dissolvable material. The length of the initial axial spacing naturally depends on the desired outer diameter of the coupling flange 13a shown in FIG. 4. After this positioning, the fibers, impregnated with synthetic resin and comprising, for example glass, carbon or synthetic material, are wound onto the so formed winding mold with a ±45° angular displacement as shown at 15 over the winding mandrel 11, the coupling core 13 and the hexagonal shell 14, whereby the finished winding shell 19 results as shown in FIG. 2.

FIG. 2 shows that after the winding operation is completed the mandrel 11 is surrounded by a shell 17 forming a shaft component and the core 13 is encased together with the sleeve 14 by the sleeve 19. Further, after the end of the winding operation, the connection between the sleeve 14 and the shaft 12 of the winding mandrel 11 is loosened, for example, by rotating the mandrel 11 slightly relative to the sleeve 14.

As shown in FIGS. 3 and 4, in the third phase, the formed connecting laminate or wound structure with the sleeve 19 and the shell 17 is then pressed together in the longitudinal direction $R_v$ by means of a pressing tool 16, whereby the ends of the shell 17 and of the sleeve 19 are pressed against the core 13 to form a relatively flexible disk shaped coupling flange 13a functioning as a universal joint between the shell 17 and the sleeve 19 which may function as shaft components. Now the curing is performed. Thereafter, in the fourth phase of the method, that is, after the hardening or curing cycle, the structural component is removed from the pressing tool and the winding mold is removed. The winding mandrel 11 with the thin shaft 12 is extracted from the formed fiber compound shaft shell 17. The core 13 and, when necessary the spacers, and the sleeve 14 may then be dissolved or washed away by means of heating to melt the core 13 and sleeve 14 or by dissolving the core and sleeve in water.

FIG. 5 shows a variation of the structural component manufactured according to the invention. The shaft elements 20 and 21 are, in this instance, individual components, which may be made of metal, of synthetic material, or of compound material such as fiber compound material. These components are initially bonded to a core member 113a, for example, by means of gluing. The core member 113a together with the shafts 20 and 21 are wrapped or wound with a GFK-fiberglass compound synthetic resin material to form a laminate with a fiber direction as described above. The formed coupling member 119a is thus integrated with these shafts 20 and 21. However, rather than winding the coupling member 119a directly onto the shafts 20 and 21 as described, the coupling member 119a may be wound separately, then secured to the shafts 20 and 21 by a press fit and subsequently hardened.

As shown in FIG. 5, the universal coupling member 119a also has a disk shaped flange 30 between two bushings 18 which may form two shaft components secured to the shafts 20 and 21. The disk shaped flange 30 may be compared to one fold of a bellows between the bushings 18. The flange 30 has two axially spaced walls 31 and 32 the thickness of which diminishes radially outwardly and which form a hollow disk flange. A curved circumferential wall portion 33 is thinner than the tapering flange walls 31 and 32 as shown in FIG. 5. The curved wall portion 33 flexibly interconnects the two tapering wall portions 31 and 32 for achieving the above mentioned high torsional rigidity and axial deformability.

Driving shafts made by the present method, constitute an integrated structure and permit, by means of the combination of the material selection of the winding method and of the structural concept, in an absolutely reliable manner, a non-wearing compensation of angular changes and length changes of the drive shaft as indicated by the arrows 22, 23, and 24 in FIG. 4.

Although the invention has been described with reference to specific example embodiments, it is to be understood, that it is intended to cover all modifications and equivalents within the scope of the appended claims.

What is claimed is:

1. A method of making a universal coupling member of fiber compound material having a disk shaped flange between two shaft components and a longitudinal axis for transmitting torque between a driving member and a driven member, comprising the following steps:
   (a) assemblying on a portion (12) of a winding mandrel (11), a core (13) and a sleeve (14) to form a winding mold, said core having a larger diameter than said mandrel or sleeve, said core further having substantially the form and dimensions of said disk shaped flange,
   (b) winding a fiber material onto said winding mold so that the individual turns extend at an angle of about ±45° relative to said longitudinal axis to form a wound structure including said disk shaped flange and said shaft components,
   (c) impregnating said fiber material prior or after said winding step,
   (d) compressing the wound structure in the direction of said longitudinal axis to form said disk shaped flange, and
   (e) curing the wound structure.

2. The method of claim 1, wherein said core (13) is spaced from said mandrel (11) and wherein said sleeve (14) is spaced from said core (13) prior to said winding step, for providing an axial spacing between the mandrel and the sleeve which spacing determines the outer diameter of said disk shaped flange when said axial compressing step is completed.

3. The method of claim 1 or 2, wherein said winding mandrel (11), said core (13), and said sleeve (14) of said winding mold are made of a dissolvable material, and dissolving said winding mold subsequent to said hardening with a solvent which is innert relative to the fiber compound material.

4. The method of claim 1, wherein said shaft components are formed as bushings (18) and securing one of said bushings to a driving member and the other of said bushings to a driven member, (FIG. 5).

5. A universal coupling member of fiber compound material manufactured according to claim 1, comprising two bushings (18) and a single hollow disk flange (30) interconnecting said bushings (18), said hollow disk flange having two substantially radially extending wall portions (31, 32) the wall thickness of which diminishes radially outwardly, and a curved circumferential wall portion (33) having the smallest wall thickness relative to said wall portions, said circumferential wall portion operatively interconnecting said radially extending wall portions (31, 32), whereby a substantial torsional rigidity and axial deformability are achieved.

* * * * *